K. GAMMEL.
COOKING UTENSIL.
APPLICATION FILED MAR. 3, 1916.

1,349,567.

Patented Aug. 17, 1920.

Inventor.
KARL GAMMEL
By his Attorney
Messimer & Austin.

UNITED STATES PATENT OFFICE.

KARL GAMMEL, OF CLEVELAND, OHIO, ASSIGNOR TO THE CLEVELAND MACARONI COMPANY, OF CLEVELAND, OHIO.

COOKING UTENSIL.

1,349,567.  Specification of Letters Patent.  Patented Aug. 17, 1920.

Application filed March 3, 1916. Serial No. 81,814.

*To all whom it may concern:*

Be it known that I, KARL GAMMEL, a citizen of the United States, and resident of Cleveland, in the county of Cuyahoga and State of Ohio, have invented certain new and useful Improvements in Cooking Utensils, of which the following is a specification.

My invention relates in general to improvements in cooking utensils and particularly relates to improvements in such utensils which are formed of units, each designed to constitute a separate utensil in itself and when assembled designed to constitute a steamer or double boiler. While the invention relates to cooking utensils which may be used for any purpose, the device disclosed is particularly designed for use in the cooking of macaroni, spaghetti and the like and the several utensils are particularly designed to be used in connection with the several steaming and baking operations incidental to the preparation of macaroni and similar edible pastes.

One of the objects of the invention is to provide a compound utensil of the above indicated character, the several units of which are each of simple construction and which are so designed when assembled to constitute a boiler or steamer that strains on an upper wall are transmitted directly and along substantially vertical lines to a lower supporting wall. This wall construction is designed so as to provide supports for a closing cover positioned below the upper edge of whatever may be the top unit thereby to facilitate packing.

A further object of the invention, incidental to the desideratum of economical construction, is to utilize handle fastening means for the purpose of providing resilient stops to hold the cover in place when draining liquid from the covered utensil.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

Figure 1:
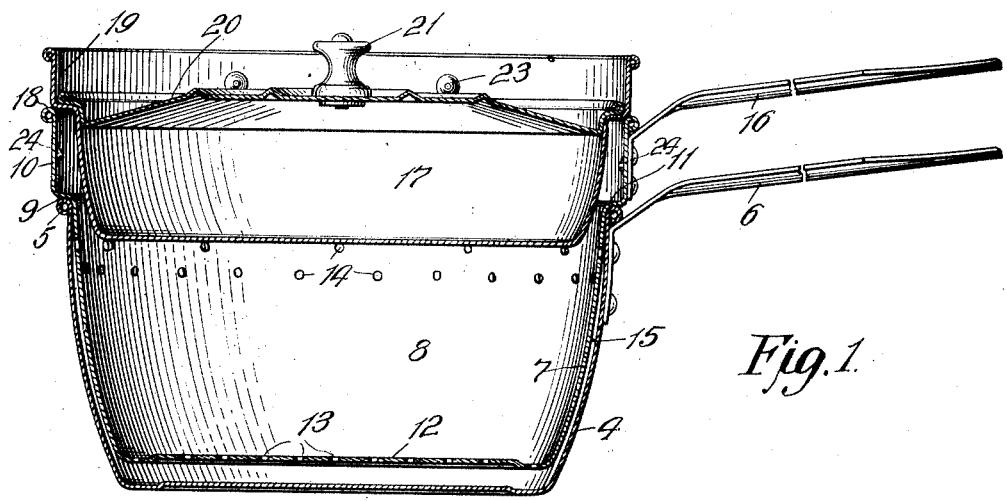
Figure 2:
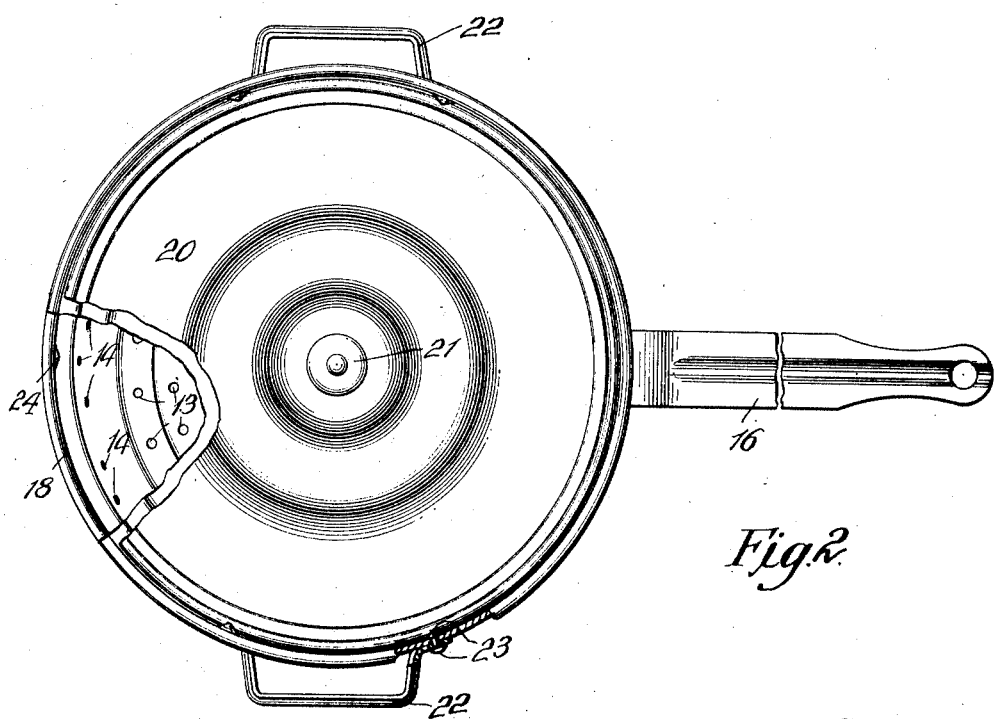

In the accompanying drawings:

Figure 1 is a vertical sectional view taken axially through the nested utensils and illustrating the preferred embodiment of my invention; and Fig. 2 is a plan view looking down upon the device shown in Fig. 1 with parts of the cover and bottom of the baking dish broken away.

In the following description and in the claims, parts will be identified by specific names for convenience of expression but they are intended to be as generic in their application to similar parts as the art will permit.

In the drawings there is illustrated a series of nested utensils, each of which is a complete article capable of use either singly or collectively. There is included a lower water containing receptacle 4 having an opened top outlined by a beaded edge 5 and provided with a handle 6 all as is usual with the ordinary sauce-pan. The intermediate utensil 7 constitutes a steamer when assembled with the receptacle 4 and is designed to constitute a colander when used separately. This utensil 7 includes a lower body portion 8 disposed within the outlines of the receptacle 4 and has its upper portion enlarged to overlap the receptacle 4 and to form an external shoulder 9 designed to rest on and be supported by the edge 5 of the receptacle 4. The wall 10 outlining the upper portion of this intermediate utensil forms substantially a continuation of the side wall of the receptacle 4 so that strains on this upper wall are transmitted in substantially vertical lines direct to the wall outlining the receptacle 4. The enlarging of the upper portion of this steamer forms an annular seat 11 positioned below the upper edge thereof designed to support a closing cover hereinafter described. The bottom 12 of this steamer is provided with a series of perforations 13 and the upper side of the body portion 8 is provided with a plurality of apertures 14 communicating with the steam passageway 15 formed between the side wall of the utensils 4 and 7. The lower portion of the side of the steamer is not perforated and the apertures 14 are designed to be above the normal level of the goods in the steamer. This arrangement of apertures causes the steam to pass through the goods uniformly and in substantially vertical lines from top to bottom of the goods. If desired, the colander may be provided with a handle 16. Telescoping within the colander 7 is a baking dish 17 relatively shallow, imperforated and constituting the third unit of the utensil. The upper portion of the baking dish is enlarged to have a configuration similar to the upper portion of the colander, is designed to form a shoulder 18, similar to the shoulder 9, to rest on top of the outlining edge of the colander 7 and also designed to provide a seat 19 similar to the seat 11, both formed to accommodate the cover 20 fitted thereto within the enlarged portion of the baking dish or colander. The cover supporting shoulder of both the baking dish and colander are so designed that the one cover 20 may fit either utensil, and the walls about the seats are preferably arranged so that the periphery of the cover has a tight fit therewith. The shoulders are so positioned that the cover is contained well below the upper edge of the utensil so that when the cover is inverted to bring the knob 21 within the shouldered utensils, the entire device may be packed conveniently for shipping.

The baking dish is provided with diametrically positioned outwardly extending handles 22 fastened in position by rivets 23. These rivets extend inwardly above the seat 19 and are designed to overlap the outlining edge of the cover so as to resist any unseating movement of the cover. In this way the baking dish may be tilted to drain the same without displacing the cover and this result is attained without adding to the structure any device other than what is necessary to hold the handles 22 in place. At the same time the cover may be forcibly withdrawn from its seat which action is facilitated by the beveled side of the rivets which permit of a wedging action reacting to spring the sides of the baking dish to release the cover.

The upper wall of the steamer above the seat 11 may be provided with a plurality of rivets 24 with the inner ends similar to the rivets 23 to hold the cover in place on the seat 11 when the baking dish is omitted from the nest of utensils.

While I have shown and described and have pointed out in the annexed claims, certain new and novel features of my invention, it will be understood that various omissions, substitutions and changes in the form and details of the device illustrated and in its operation may be made by those skilled in the art without departing from the spirit of the invention.

Having thus described my invention, I claim:

1. An open top cooking utensil including a body portion and an upper portion enlarged from the body portion to form an internal annular seat below the upper edge of the utensil, handles mounted on the outside of the utensil, rivets for fastening the handles in place, portions of said rivets extending into the enlarged upper portion of the utensil and spaced a short distance above said internal annular seat to form stops for resisting the unseating movement of any cover fitted on the seat and a cover supported from said seat and fitted within the enlarged portion of the utensil, said cover adapted to engage the stop portions of said rivets to spring the sides of the utensil thereby to permit the withdrawal of the cover.

2. An open top cooking utensil including a body portion and an upper portion enlarged from the body portion to form an internal annular seat below the upper edge of the utensil, handles mounted on the outside of the utensil, rivets for fastening the handles in place, portions of said rivets extending into the enlarged upper portion of the utensil and spaced a short distance above said internal annular seat to form stops for resisting the unseating movement of any cover fitted on the seat.

Signed at Cleveland, in the county of Cuyahoga and State of Ohio, this 24th day of February, A. D. 1916.

KARL GAMMEL.

Witnesses:
J. H. VAN DERVEER,
GEO. N. DOBIE.